(12) United States Patent
Kapoor et al.

(10) Patent No.: US 10,862,804 B2
(45) Date of Patent: Dec. 8, 2020

(54) REDIRECTING DATA PACKETS BETWEEN OVERLAY NETWORK AND UNDERLAY NETWORK

(71) Applicant: COLORTOKENS, INC., Santa Clara, CA (US)

(72) Inventors: Anoop Singh Kapoor, San Jose, CA (US); Ashish Trivedi, Fremont, CA (US); Ravi Voleti, Fremont, CA (US); Deepak Mohanty, Fremont, CA (US); Mritunjay Kumar, San Jose, CA (US)

(73) Assignee: COLOTOKENS INC.CA (US)

( * ) Notice: Subject to any disclaimer, the term of this patent is extended or adjusted under 35 U.S.C. 154(b) by 23 days.

(21) Appl. No.: 16/155,855

(22) Filed: Oct. 9, 2018

(65) Prior Publication Data

US 2020/0112510 A1 Apr. 9, 2020

(51) Int. Cl.
*H04L 12/801* (2013.01)
*H04L 29/12* (2006.01)

(52) U.S. Cl.
CPC .......... *H04L 47/12* (2013.01); *H04L 61/2007* (2013.01)

(58) Field of Classification Search
CPC .................. H04L 47/12; H04L 61/2007
See application file for complete search history.

(56) References Cited

U.S. PATENT DOCUMENTS

| 9,461,881 B2* | 10/2016 | Kumarasamy | H04L 41/0846 |
| 2013/0268983 A1* | 10/2013 | Um | H04N 21/2402 725/93 |
| 2014/0047080 A1* | 2/2014 | Piccolo, III | H04L 63/20 709/220 |
| 2015/0215918 A1* | 7/2015 | Wu | H04W 72/0433 370/329 |
| 2015/0222489 A1* | 8/2015 | Perez Martinez | H04L 43/028 370/328 |
| 2018/0219951 A1* | 8/2018 | Hashmi | H04L 12/4633 |
| 2019/0052598 A1* | 2/2019 | Hira | H04L 47/125 |
| 2019/0306088 A1* | 10/2019 | Chilikin | H04L 49/9036 |

\* cited by examiner

*Primary Examiner* — Andrew Lai
*Assistant Examiner* — Harry H Kim
(74) *Attorney, Agent, or Firm* — Barry Choobin; Patent 360 LLC (57) ABSTRACT

A system and method for redirecting data packets communicated to a computing device over an overlay network is disclosed. The method includes monitoring resources installed on the computing device to identify the resources communicating over dedicated underlay IP address. The method further includes creating a rule based on the resources identified. The rule is transferred and stored on the computing device. On receiving a data packet, the rule is executed for redirecting the data packets from the overlay network to an underlay network and vice versa. The data packets are redirected by translating a destination IP address on a header of the data packet from an overlay IP address to an underlay IP address. The method thus redirects the data packets from the overlay network to the underlay network before reaching the resource, thereby preventing dropping of the data packet.

11 Claims, 7 Drawing Sheets

REDIRECTING DATA PACKETS BETWEEN OVERLAY NETWORK AND UNDERLAY NETWORK

BACKGROUND

Technical Field

The embodiments herein are generally related to the field of internetworking in data communication such as data communication over an overlay network and routing data, packets between an overlay network and an underlay network.

Description of the Related Art

Internet has gained a huge popularity among the different modes of communication. The internet has redefined the traditional modes of communication by providing services including entails, internet television, audio and video streaming websites and the like. The interact comprises a plurality of computing devices (nodes) communicating over a common network. As the plurality of computing devices communicates, a data packet from a first computing device (source) is routed to a second computing device (destination) The data packets are routed to different nodes based on a destination Internet Protocol (IP) address on a header of the data packets. This approach is known as tunneling. However, there is certain security issues faced while communicating over the internet.

Recently, overlay networks were proposed to provide additional security while coma communicating over the internet. The overlay networks are proposed as a way to improve Internet routing such as quality of services, network security and the like. The overlay networks are computer network built on top of another network called an underlay, network. Nowadays, the internet act as the underlay network over which many overlay network is constructed. The nodes in the overlay network are connected through a virtual or logical links or through physical links in the underlay network.

One method of providing additional security includes terminating or mitigating the attack surface of a computer network by creating a secure overlay networks called color zones. Each color zone comprises an address space. The plurality of computing devices communicates by routing the data packets (traffic) over the color zones. However, routing the data packets over the color zones includes certain deployment challenges. Initially, a Domain Name System (DNS) server needs to provide the destination overlay IP address in the header of the data packets. The destination overlay IP address is provided in the header using a specialized DNS server capable of translating an underlay IP address to an overlay IP address.

The deployment challenges include communicating with computing devices or nodes having resources (such as services or application) running on hard coded underlay network. Such services or applications or already deployed services are referred to as Brown Field services. The services and applications running on hard coded underlay network are configured to listen to a specific underlay IP address. Therefore, when the overlay network (color zone) is created over the underlay network, the data packets with the destination IP address as the overlay IP address cannot be received by computing devices with services running on hard coded underlay network. In such cases, the data packets routed to the computing device is dropped without reaching the computing device. The DNS name server does not overcome this challenge.

Hence, there is a need for a system and a method for redirecting the data packets from overlay network to underlay network and vice versa. There is also a need for a method for providing uninterrupted traffic to the computing, devices with applications running on hardcoded underlay network.

SUMMARY OF THE EMBODIMENTS HEREIN

The embodiments herein provide a system and a method for redirecting data packets over an overlay and/or underlay network. The method includes creating a rule for redirecting data packets between an overlay network and an underlay network. The rule is stored on the computing device. On receiving a data packet, the rule is executed for redirecting the data packets from the overlay network to an underlay network and vice versa. The data packets are redirected by translating a destination IP address on a header of the data packet from an overlay IP address to an underlay IP address. The method thus redirects the data packets from the overlay network to the underlay network before reaching the resource, thereby preventing dropping of the data packet According to an embodiment herein, a computing network system is disclosed. The computing network system comprises a plurality of computing devices, an application rewiring module, a first Domain Name System (DNS) server and a packet redirection module. The plurality of computing devices is communicatively coupled over an overlay network. The overlay network is created by assigning an overlay Internet Protocol (IP) address to each computing device among the plurality of computing devices. The application rewiring module on each computing device is configured for monitoring resources (services/applications) installed on each computing device. The application rewiring, module identifies the resources communicating on a dedicated underlay IP address. The application rewiring module updates a list of identified resources on a controller. The first DNS server is configured to store an underlay. IP address of each computing device among the plurality of computing devices, and a uniform resource locator (URL) of the resources installed on the plurality of computing devices.

The packet redirection module includes a second DNS server, a data base and a controller. The second DNS server is configured to store the overlay 1P address for each computing device among the plurality of computing devices. The database is configured to store the underlay IP address and the overlay IP address of each computing device among the plurality of computing devices. The controller is configured to control flow of data packets communicated between the plurality of computing devices. The controller creates a rule for each resource updated on the controller, wherein the rule is created for controlling the flow of the data packets communicated to and from the corresponding computing device. The rule is transferred and stored on the application rewiring module in the corresponding computing device. The application rewiring module, on receiving a data packet executes the rule to redirect the data packets communicated over the overlay network to the underlay network and vice versa to enable communication.

According to an embodiment herein, the plurality of computing devices is selected from a group consisting of computers, laptops, mobile phones, servers and databases.

According to an embodiment herein, the data packet comprises a header containing a source IP address and a destination IP address.

According to an embodiment herein, the application rewiring module on receiving the data packet executes the rule to redirect the data packets by translating a destination IP address from the overlay IP address to the underlay IP address of the computing device.

According to an embodiment herein, the application rewiring module on sending the data packet executes the rule to redirect the data packets by translating the source IP address from the underlay IP address to the overlay IP address of the computing device.

According to an embodiment herein, the overlay network is a color zone built over the underlay network by assigning the overlay IP address to each computing device.

According to an embodiment herein, the packet redirection module prevents dropping of the data packets by redirecting the data packets communicated over the overlay network to the underlay network and vice versa.

According to an embodiment herein, the rule is created based on type of Operating System (OS) of the computing device, including but not limited to Linux, Windows, MacOS, iOS, Android and the like.

According to at embodiment herein, the resources communicated on the dedicated underlay IP address is identified by fetching data from an application program interface on a computing device.

According to an embodiment herein, the data packets redirected from the overlay network to the underlay network are circulated on an IP stack to be accessed by the resources in the computing device.

According to an embodiment herein, a computing apparatus is disclosed. The computer apparatus comprises one or more computer readable storage media. The computer apparatus comprises a processing system communicatively coupled to one or more computer readable storage media. The computer apparatus comprises program instruction stored on one or more storage media for controlling flow of data packets between a plurality of computing devices communicatively coupled over an overlay network, that when read and executed by the processing system, direct the processing system to monitor the plurality of computing devices to identify a list of resources communicating on a dedicated underlay IP address, wherein the list of resources are updated on a controller. The processing system creates a rule for each computing device comprising resources communicating over a dedicated underlay IP address. The rule is created based on the type of the operating system of each computing device. The rule is created for controlling the flow of the data packets communicated to and from the corresponding computing device. The processing system further transfers the rule to each computing device. The rule is stored on an application rewiring module in the corresponding computing device. The processing system furthermore executes the rule stored on the application rewiring module on receiving and transmitting the data packets. The rule redirects the data packets communicated over the overlay network to an underlay network and vice versa to enable communication of the computing device.

According to an embodiment herein, the plurality of computing devices is selected from a group consisting of computers, laptops, mobile phones, servers and databases.

According to an embodiment herein, the data packet comprises a header containing a source IP address and a destination IP address.

According to an embodiment herein, the processing system executes the rule to redirect the data packets transmitted to the computing device by converting a destination IP address from an overlay IP address to an underlay IP address.

According to an embodiment herein, the processing system executes the rule to redirect the data packets transmitted from the computing device by converting a source IP address from an underlay IP address to an overlay IP address.

According, to an embodiment herein, the processing system creates the rule based on the resources identified by the application rewiring module in the computing device.

According to an embodiment herein, a computer implemented method of controlling flow of data packets between a plurality of computing devices. The computer implemented method includes storing program instructions on one or more computer readable storage media. The method includes executing the program instructions by a processing system for controlling the flow of the data packets between the plurality of computing devices. On executing the program instructions, the processing system monitors the plurality of computing devices to identify a list of resources communicating on a dedicated underlay IP address, wherein the list of resources are updated on a controller. The processing system creates a rule for each computing device comprising resources communicating over a dedicated underlay IP address. The rule is created based on the type of the operating system of each computing device. The rule is created for controlling the flow of the data packets communicated to and from the corresponding computing device. The processing system further transfers the rule to each computing device. The rule is stored on an application rewiring module in the corresponding computing device. Further the processing system executes the rule stored on the application rewiring module on receiving and transmitting the data packets. The rule redirects the data packets communicated over the overlay network to an underlay network and vice versa to enable communication of the computing device.

According to an embodiment herein, the execution of the rule redirects the data packets transmitted to the computing device by converting a destination IP address from an overlay IP address to an underlay IP address.

According to an embodiment herein, the execution of the rule redirects the data packets transmitted from the computing device by converting a source IP address from an underlay IP address to an overlay IP address These and other aspects of the embodiments herein will be better appreciated and, understood when considered in conjunction with the following description and the accompanying drawings. It should be understood, however, that the hollowing descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will be apparent to those skilled in the art from the following description of the preferred embodiment herein and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a system and a method for redirecting data packets communicated between an overlay network to an underlay network and vice versa. The system redirects the packets by communicated from a first computing device over the overlay network, to a second computing device with services or applications running at hard coded underlay IP address. The system redirects the data packet by converting an overlay IP address to a corresponding underlay IP address, thereby preventing the packets from being dropped before reaching the second computing device.

Figure 1:
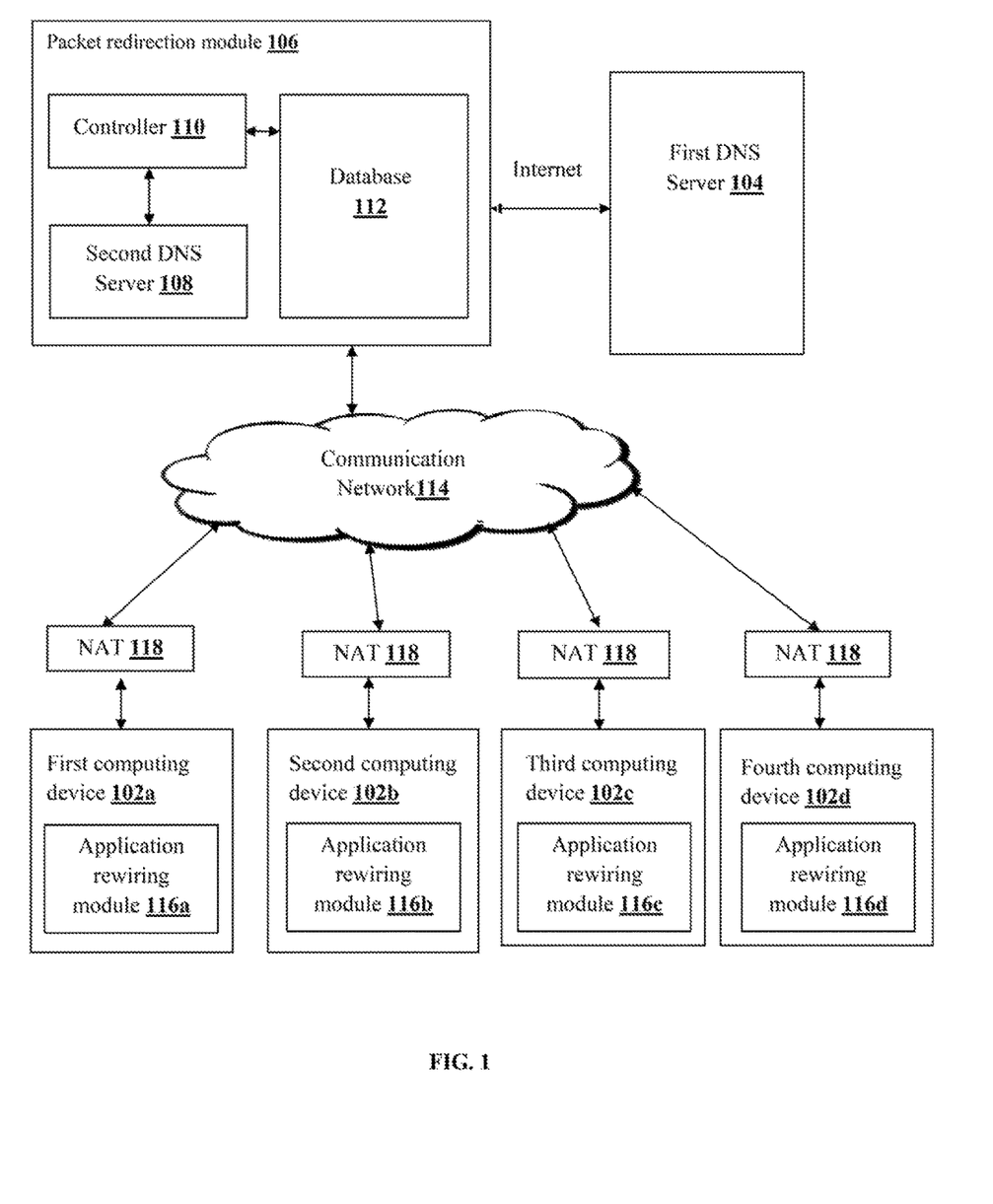
FIG. 1 illustrates a functional block diagram of a system for redirecting data packets from an overlay network to an underlay network, according to one embodiment herein.

FIG. 1 illustrates a functional block diagram of a system for redirecting data packets from an overlay network to an underlay network, according to one embodiment herein. The system comprises a plurality of computing devices 102a, 102b, . . . 102d communicating to each other over a communication network 114. The plurality of computing devices 102a, 102b . . . 102d are connected to an underlay network. The examples of plurality of computing devices 102a, 102b . . . 102d include but are not limited to computers, mobile phones, smart phones, servers and the like. Each computing device among the plurality of computing devices 102a, 102b . . . 102d is assigned an underlay Internet Protocol (IP) address. The underlay IP address for each computing device is stored on a first Domain Name System (DNS) server 104. The first DNS server 104 may be an upstream DNS server. The first DNS server 104 stores the web address or Uniform Resource Locator (UPL) of various resources (service or application) on each computing device and the corresponding underlay IP address of the computing device.

The plurality of computing devices 102a, 102b . . . 102d is communicatively coupled over a secure overlay network. The overlay network termed as a color zone is created over the underlay network. The color zone comprises a dedicated IP address space. The color zone is created by assigning an overlay IP address to each computing device. Further, the communications between the computing devices among the plurality of computing devices are routed over the color zone. The plurality of computing devices 102a, 102b . . . 102d comprises a plurality of application rewiring modules 116a, 116b . . . 116d. Each computing device among the plurality of computing devices comprises an application rewiring module.

The plurality of application rewiring modules 116a, 116b . . . 116d continuously monitors the plurality of computing devices 102a, 102b . . . 102d. The plurality of application rewiring modules 116a, 116b . . . 116d identifies the computing devices comprising resources services or application) running on hard coded underlay IP address. Such services or applications are referred to as Brown Field Services. The plurality of application rewiring modules 116a, 116b . . . 116d identifies the computing devices by fetching data from an Application Program Interface (API) on the plurality, of computing devices 102a, 102b . . . 102d. The details of the computing devices and a list of resources running on hard coded underlay IP is updated on a controller 110. Further, when a new application is installed on any computing device among the plurality of computing devices 102a, 102b . . . 102d, the application rewiring module on the corresponding computing device dynamically and automatically updates the list of resources provided to the controller 110.

The system further comprises a packet redirection module 106 comprising a second DNS server 108, the controller 110 and a database 112. The second DNS server 108 stores the overlay IP address assigned to each computing devices among the plurality of computing devices 102a, 102b . . . 102d. The second DNS server 108 act as a name space resolver for all applications/services running on the overlay network called the color zones. The database 112 comprising the underlay IP address and corresponding overlay IP address of each computing device among the plurality of computing devices 102a, 102b . . . 102d.

Further, the controller 110 dynamically and automatically creates a rule for each computing device comprising the resources running on the hard coded underlay IP address. The rule is created based on type of Operating System (OS) of the computing device, including but not limited to Linux, Windows, MacOS, iOS, Android and the like. The rule created by the controller is transmitted, back to the application rewiring module in the corresponding computing device. The controller further controls the flow of data packets among the plurality of computing devices.

The plurality of computing devices 102a, 102b . . . 102d communicates over the overlay network. The plurality of computing device 102a, 102b . . . 102d includes the resources (such as services and applications) running on hard coded underlay IP address. The resources running on the hardcoded underlay IP address is capable of receiving the data packets via the underlay network. The data packets routed on the overlay network with the overlay IP address as the destination address therefore gets dropped on reaching the resources running on hard coded underlay IP address. The packet redirection module 106 enables translating the destination IP address by replacing the overlay IP address with the underlay IP address, thereby enabling communication with resources running on hard coded underlay IP address.

The steps of establishing communication are as follows, Consider a first computing device 102*a* initiating a DNS lookup request. The DNS lookup request is forwarded to the first DNS server 104. The first DNS server 104 comprises the URL of the resources on each computing device and the corresponding underlay IP address of the computing device. For example, consider the underlay IP address of the first computing device 102*a* as 1.1.1.1 and the second computing device 102*b* as 2.2.2.2. The first DNS server 104 comprises the URL of the requested resource. Consider the URL of the requested resource as app.com.

Further, the underlay IP address of the second computing device 102*b* 2.2.2.2 is communicated to the packet redirection module 106. The database 112 in the packet redirection module 106 comprises the underlay IP address and the corresponding overlay IP address of the second computing device. The second DNS server 108 comprises the overlay IP address of the first, computing device 102*a* and the second computing device 102*b*. For example, consider the overlay IP address of the first computing device 102*a* and the second computing device 102*b* as 192.168.24.2 and 192.168.24.3 respectively. Further, the overlay IP address of the first computing device 102*a* and the second computing device 102*b* is communicated to the first computing device 102*a*.

Further, the first computing device 102*a* generates a data packet with a header comprising the overlay IP address, of the first computing device 102*a* as the source IP address and the overlay IP address of the second computing device 102*b* as the destination IP address. The data packet comprises 192.168.242 as the source IP address and 192.168.243 as the destination IP address. The first computing device 102*a* transmits the data packet to the second computing device 102*b* over the overlay network.

Once the second computing device 102*b* receives the data packet, the application rewiring module 116 executes the rule to prevent the dropping of the data packet. The data packet transmitted from the first computing device 102*a* with the destination IP address 192.168.243 cannot be received by the application running on hard coded underlay IP address 2.2.2.2 of the second computing device 102*b*.

On receiving the data packet transmitted from the first computing device 102*a*, the application rewiring module 116*b* redirects the data packets communicated over the overlay network to the underlay network, thereby preventing the dropping of data packets reaching the resources running, on the hard coded underlay IP address. The application rewiring module 116*b* executes the rule to convert the overlay IP address of the second computing device 102*b* to the underlay IP address. The overlay IP address 192.168.24.3 of the second computing, device 102*b* is converted to the underlay IP address 2.2.2.2. The network address translation (NAT) module 118 remaps an IP address into another by modifying IP address in the header. Thus, the data packets are routed to the second computing device 102*c* without being dropped.

Further, when a data packet is transmitted, back from the second computing device 102*b* to the first computing device 102*a*, the second computing device 102l generates a second data packet with a header comprising the underlay. IP address of the second computing device 102*b* as the source IP address and the overlay IP address of the first computing device 102*a* as the destination IP address. The second data packet comprises the underlay IP address 2.2.2.2 as the source IP address and the overlay IP address 192.168.24.2 as the destination IP address. The overlay IP address of the first computing device 102*a* is identified from the data packet communicated from the first computing device 102*a* to the second computing device 102*b*.

Further, the data packet is transmitted from the second computing device 102*b* to the first computing device 102*a*. The application rewiring module 116*b* in the second computing device 102*b* executes the rule to convert the source IP address in the data packet. The rule when executed converts the source IP address by translating the underlay IP address of the second computing device 102*b* with the overlay IP address of the second computing device 102*b*. Thus when the rule is executed the underlay IP address 2.2.2.2 of the second computing device 102*b*, is converted to the overlay IP address 192.168.24.3. Further, the data packet is routed from second computing device 102*b* to the first computing device 102*a* over the overlay network.

Figure 2A:
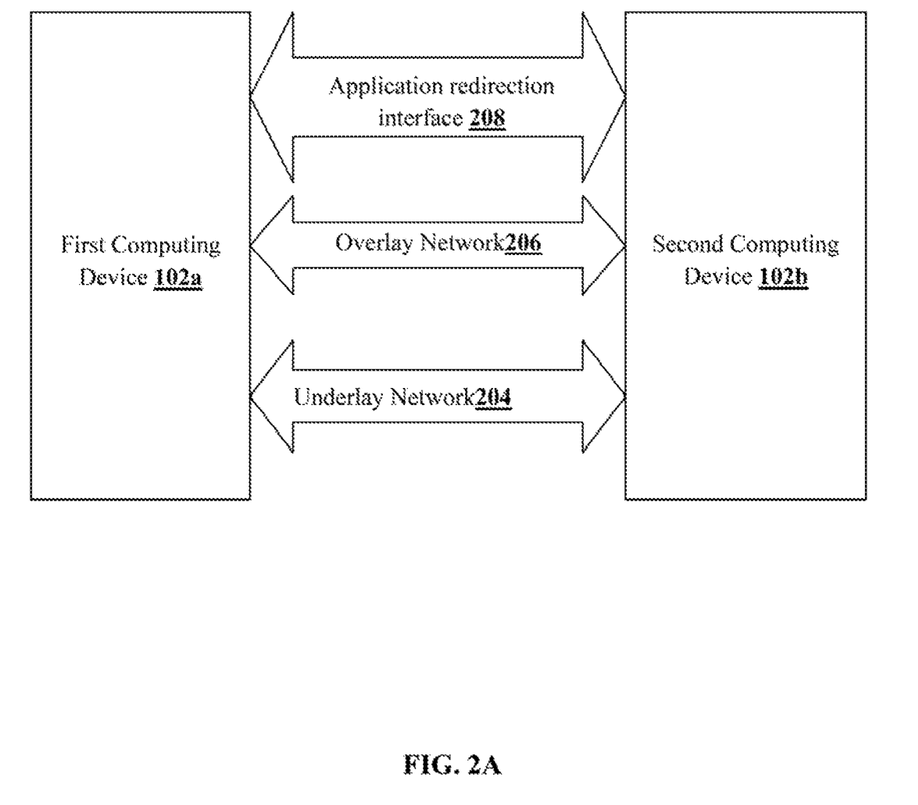
FIG. 2A illustrates a network topology diagram, according to one embodiment herein.

FIG. 2A illustrates a network topology diagram, according to one embodiment herein. The network topology diagram depicts a first computing device 102*a* communicating with a second computing device 102*b*. The examples of the first computing device 102*a* and the second computing device includes but are not limited to a computer, laptop, mobile device, server, database and the like. The communication between the first computing device 102*a* and the second computing device 102*b* is established initially over an underlay network interface 204 such as internet. Further, an overlay network 206 is created over the underlay network 204 such as color zones. Further, the communication is established using an application redirection interface 208 where the request for resources is redirected from overlay network 206 to underlay network 204 and vice versa.

If both the first computing device 102*a* and the second computing device 102*b* connected over all interfaces such as the underlay network 204 and the overlay network 206, then the communication between the first computing device 102*a* and the second computing device 102*b* is supported. Further, if the first computing device 102*a* and the second computing device 102*b* are connected over a same interface, say over the overlay, network 206, then the communication between the first computing device 102*a* and the second computing device 102*b* is supported. If the first computing device 102*a* and the second computing device 102*b* are connected over different interfaces, then the communication between the first computing device 102*a* and the second computing device 102*b* is not supported.

Figure 2B:
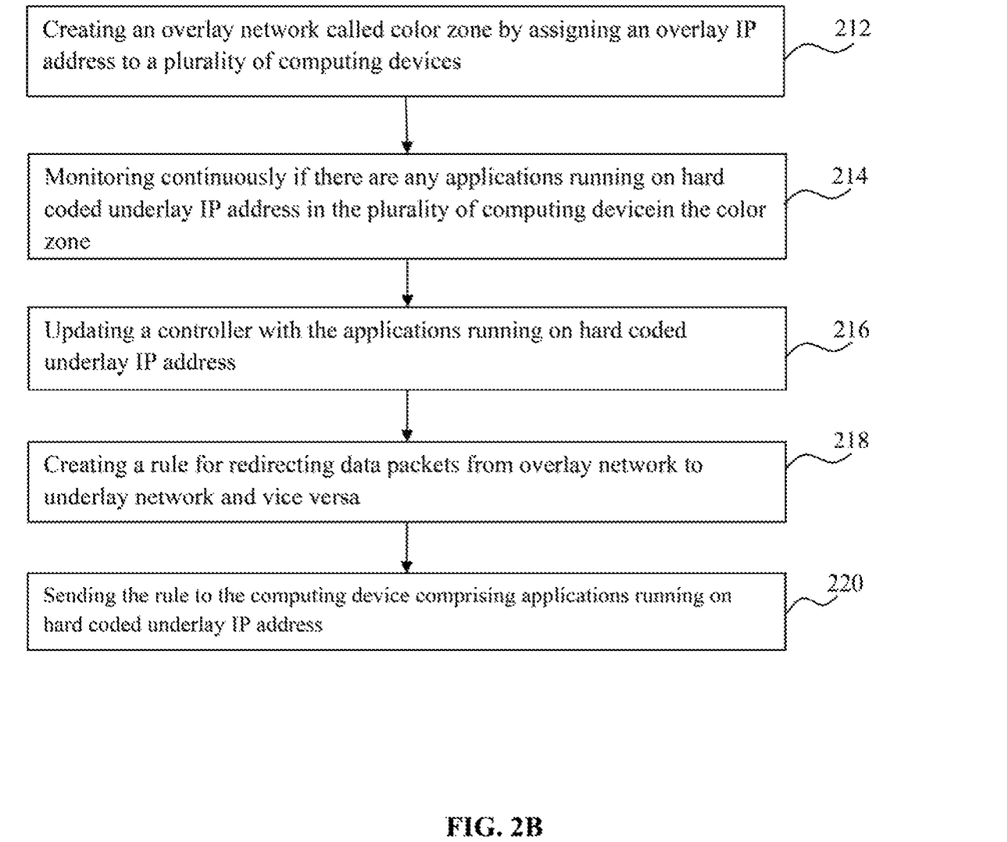
FIG. 2B illustrates a flow diagram representing a method of creating a rule for redirecting data packet between an overlay network and an underlay network, according to one embodiment herein.

FIG. 2B illustrates a flow diagram representing a method of creating a rule for redirecting data packet between an overlay network and an underlay network, according to one embodiment herein. The method includes creating an overlay network called a color zone with a plurality of computing devices communicating over the color zone (212). The examples of the plurality of computing devices include but are not limited to computer, laptop, mobile phone, server, database and the like. The color zone is created by assigning an overlay IP address for each computing device for enabling the plurality of computing devices to communicate over the color zone. The overlay IP address assigned to each computing device is stored in a second DNS server known as color master DNS server. The overlay IP address of each computing device and the corresponding underlay IP address are stored in, a database.

Further, the method includes monitoring continuously if there are any applications running on hard coded underlay IP address in the plurality of computing device connected to the color zone (214). The plurality of computing devices is monitored continuously in regular interval of time. Such applications are identified by an application rewiring module in the plurality of computing devices. Similarly, when a new application appears on a computing device, application rewiring module monitors and identifies if the application is running on hard coded underlay IP address. The method further includes updating on the controller a list of applications running on hard coded underlay IF address and the corresponding computing device (216).

Figure 2C:
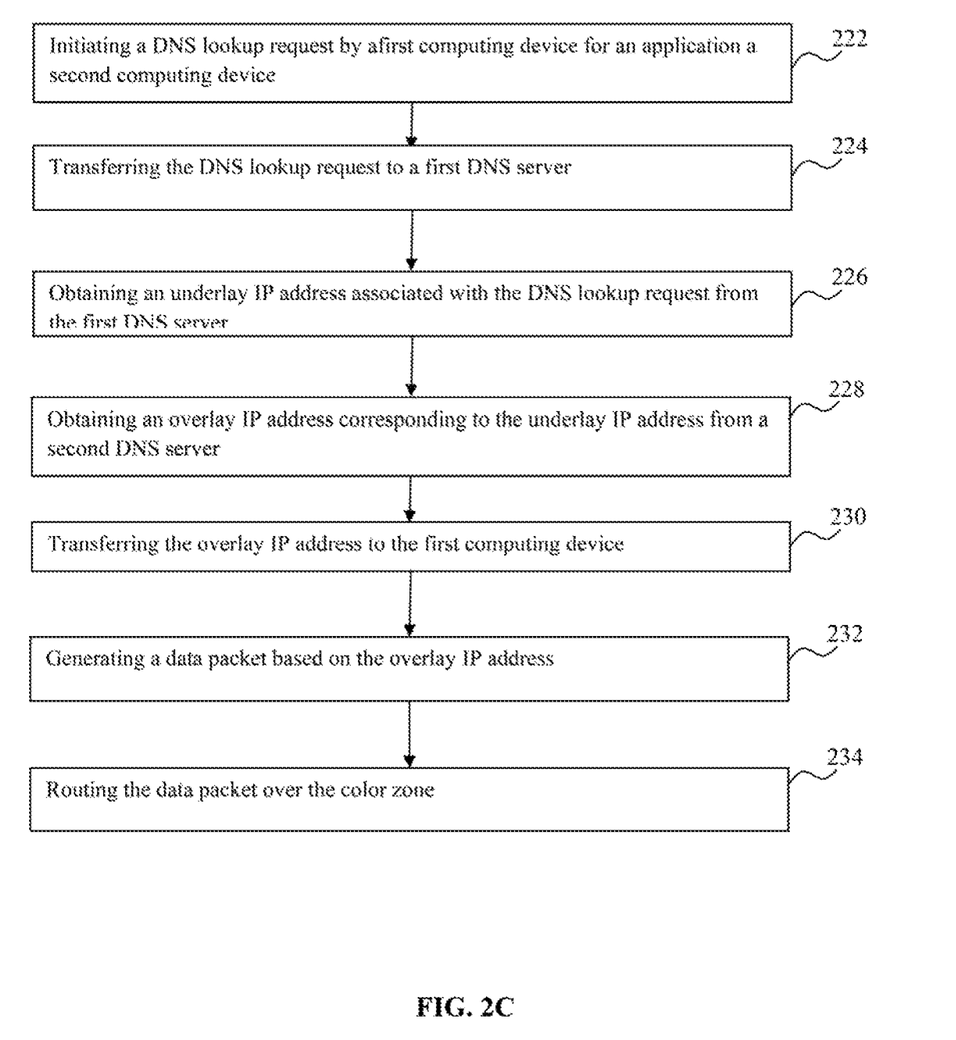
FIG. 2C illustrates a flow diagram a method of transmitting data packets from a first computing device to a second computing device over an overlay network, according to one embodiment herein.

Once an application finning on hard coded underlay IP address on a computing device is identified, then the method creates a rule for redirecting data packets communicated to the said computing device (218). The rule is created dynamically and automatically by a controller in the system based on the list of applications updated. The rule is created for redirecting the data packets communicated over the color zone to an underlay network. The rule is created based on type of Operating System (OS) of the computing device, including but not limited to Linux, Windows, MacOS, iOS, Android and the like. Further, the method includes sending the rule created to the corresponding computing device (220). The rule is stored in the application rewiring module in the computing device, FIG. 2C illustrates a now diagram a method of transmitting data packets from a first computing device to a second computing device over an overlay network, according, to one embodiment herein. The method includes initiating, a DNS lookup request by the first computing device for an application a second computing device (222). The DNS lookup request is a URL corresponding to an application. The method includes transferring the DNS lookup request to a first DNS server (224), The first DNS server stores URL of each applications and the underlay IP address of each computing device comprising the applications.

Further, the method includes obtaining the underlay IP address associated with the DNS lookup request from the first DNS server (226). The underlay IP address is obtained by identifying the underlay IP address of the computing device comprising the requested application. The underlay IP address of the second computing device comprising the requested application is thus obtained. Further, the method includes obtaining an overlay IP address corresponding to the underlay IP address from a second DNS server (228). The overlay IP address of each computing device is stored on the second DNS server. The overlay IP address and the underlay IP address of each computing device is stored on a database. Thus the overlay IP address of the second computing device is identified.

The method further includes transferring the overlay IP address of the second computing device to the first computing device (230), Further the method includes generating a data packet based on the overlay IP address (232). The data packet comprises a header and a payload. The header comprises a source IP address and a destination IP address. The data packet is generated by assigning the overlay IP address of the first computing device as the source IP address and the overlay IP address of the second computing device as the destination IP address. Further, the method includes routing the data packet over the overlay network known as color zone (234).

Figure 2D:
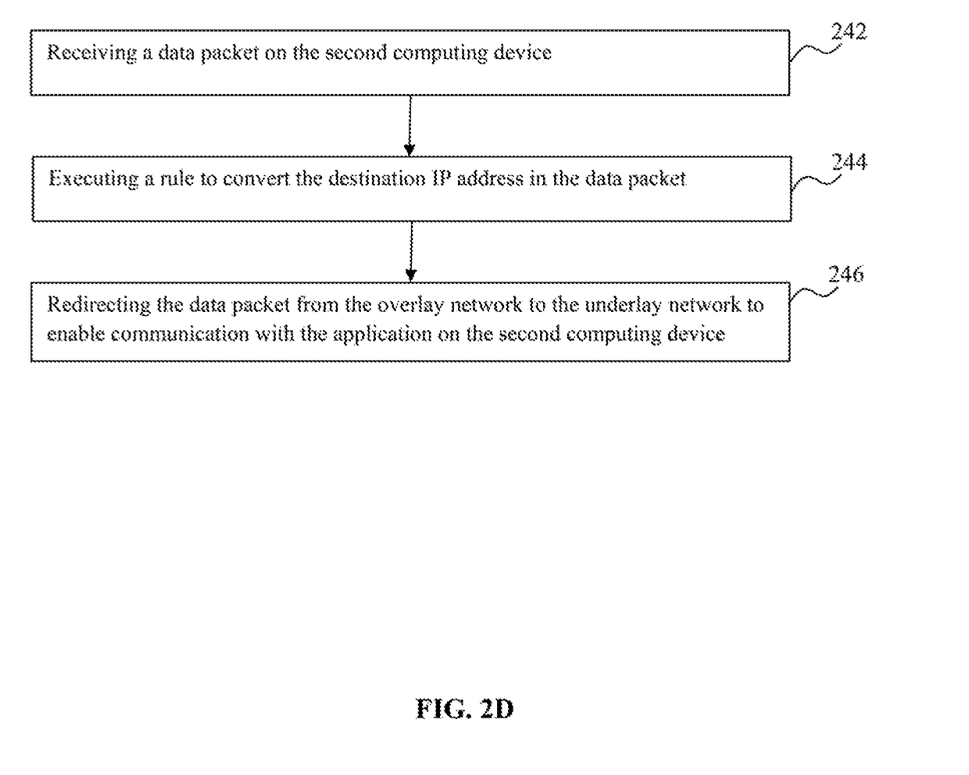
FIG. 2D illustrates a flow diagram representing a method of redirecting data packets from an overlay network to an underlay network, according to one embodiment herein.

FIG. 2D illustrates a flow diagram representing a method of redirecting data packets from an overlay network to an underlay network, according to one embodiment herein. The method includes receiving the data packet, on the second computing device over the overlay network (242). The data packet comprises the header with source IP address as the overlay IP address of the first computing device and the destination IP address as the overlay IP address of the second computing device.

Once the data packet is received at the second computing device, the data packet is stacked on, an IP stack. The method includes executing a rule to convert the destination IP address in the data packet (244). The rule is executed by an application rewiring module in the second computing device. The rule converts the destination IP address in the header by converting the overlay IP address of the second computing device with the corresponding underlay IP address of the second computing device.

The rules are created by the controller based on the type of Operating System (OS) of the second computing device. The examples of the OS include hut are not limited to Linux, Windows, MacOS, iOS, Android and the like. In one embodiment, the rule is a Linux IP table rule for performing Destination Network Address Translation (DNAT). The Linux IP table rule is executed when the second computing device is a Linux server. In another embodiment, the rule is a window port proxy rule, when the second computing device is a windows server. Further, the method includes redirecting the data packets from overlay network to underlay network to enable communication with the application on the second computing device (246). The data packets redirected to the underlay network is received by the application running on hard coded underlay IP address.

Figure 2E:
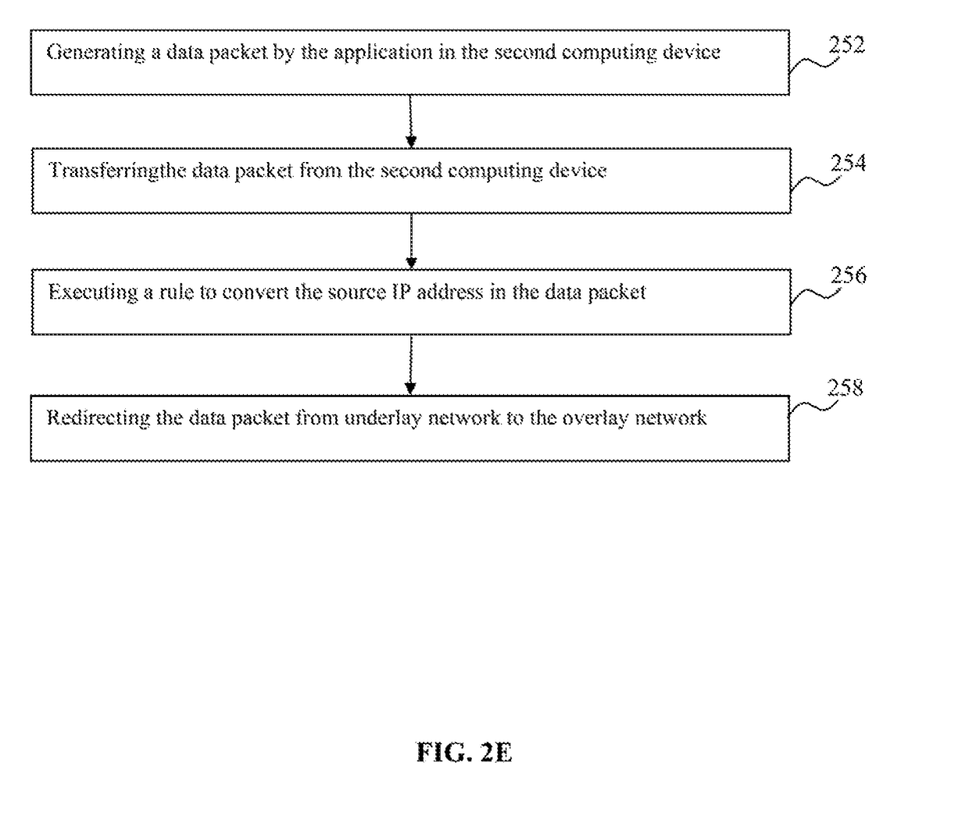
FIG. 2E illustrates a flow diagram representing a method of redirecting data packet from underlay network to an overlay network, according to one embodiment herein.

FIG. 2E illustrates a flow diagram representing a method of redirecting data packet from underlay network to an overlay network, according to one embodiment herein. The method includes generating a data packet by the application in the second computing device (252). The data packet is generated with a header comprising underlay IP address of the second computing device as the source IP address and the overlay IP address of the first computing device as the destination IP address. The overlay IP address of the first computing device is identified from the data packets communicated from the first computing device to the second computing device.

Further, the method includes transferring the data packet from the second computing device to the first computing device (254). The method includes executing a rule to convert the source IP address in the data packet (256). The rule when executed converts the source IP address by translating the underlay IP address of the second computing device with the overlay IP address of the second computing device. Further, the method includes redirecting data packets from the underlay network to the overlay network (258).

Figure 3:
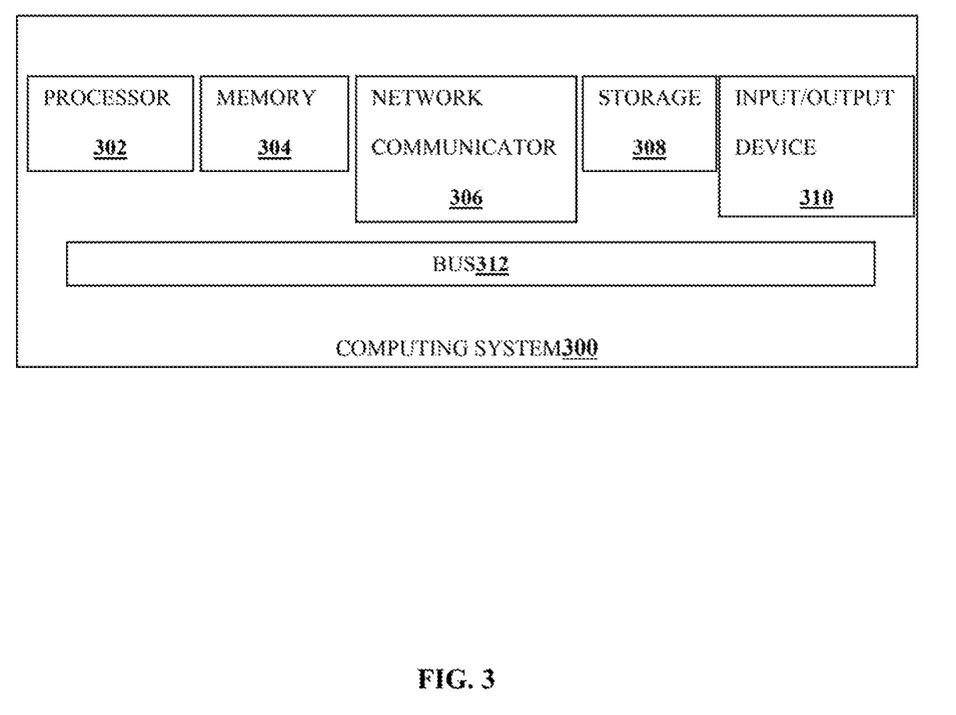
FIG. 3 is a block diagram illustrating a computing system consistent with implementations of the current subject matter, according to one embodiment herein.

FIG. 3 is a block diagram illustrating a computing system 300 consistent with implementations of the current subject matter. As shown in FIG. 3, the computing system 300 can include a processor 302, a memory 304, network communicator 306, a storage device 308, and input/output devices 310, The processor 302, the memory 304, network communicator 306, the storage device 308, and the input/output device 310 can be interconnected via a system bus 312. The processor 302 is capable of processing instructions for execution within the computing system 300. Such executed instructions can implement one or more components of, for example, application A. In some example embodiments, the processor 302 can be a single-threaded processor. Alternately, the processor 302 can be a multi-threaded processor or a multi-core processor. The processor 302 is capable of processing instructions stored in the memory 304 and/or on the storage device 308 to display graphical information for a user interface provided via the input/output device 310.

The memory 304 is a computer readable medium such as volatile or non-volatile that stores information within the computing system 300. The memory 304 can store instructions and/or other data associated with the processes disclosed herein. The storage device 308 is capable of providing persistent storage for the computing system 300. The storage device 308 can be a hard disk device, an optical disk device, or a tape device, or other suitable persistent storage means. The input/output device 310 provides input/output operations for the computing system 300. In some example embodiments, the input/output device 310 includes a keyboard and/or pointing device. In various implementations, the input/output device 310 includes a display unit for displaying graphical user interfaces.

According to some example embodiments, the input/output device 310 can provide input/output operations for a network device. For example, the input/output device 310 can include Ethernet ports or other networking ports to communicate with one or more wired and/or wireless networks (e.g., a local area network (LAN), a wide area network (WAN), the Internet).

In some example embodiments, the computing system 300 can be used to execute various interactive computer software applications that can be used for organization, analysts and/or storage of data in various formats. Alternatively, the computing system 300 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. Upon activation within the applications, the functionalities can be used to generate the user interface provided via the input/output device 310. The user interface can be generated and presented to a user by the computing system 300 (e.g., on a computer screen monitor, etc.).

Therefore, the embodiments herein disclose a method of redirecting data packets communicated to a computing device over an overlay network. When a plurality computing device comprises resources communicating on hard coded underlay IP address, then the data packets communicated over the overlay network gets dropped before reaching the resources. The method prevents dropping of the data packets by redirecting the data packets communicated over the overlay network to the underlay network and vice versa.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computer-implemented system for selectively redirecting data packets from an overlay network to an underlay network, said system comprising: a processor; a memory module communicably coupled to said processor, said memory module storing computer program code, wherein said memory module, and the processor executed by said computer program code stored is configured to:
   assign an underlay internet protocol (IP) address to a plurality of computer-based devices, and trigger storage of underlay internet protocol addresses on a first domain name system (DNS) server;
   communicably couple said plurality of computer-based devices over said overlay network, and rendering said overlay network as a dedicated overlay IP address space identifiable as a color zone, such that communication between said plurality of computer-based devices are routed only through said overlay network;
   monitor, on a continuous basis, said computer-based devices and at least applications executed thereon, and identify applications executed on hardcoded underlay IP addresses;
   dynamically create at least one rule, said rule dictating transmission of at least one data packet between an application executed with overlay IP addresses on a first computer-based device, and an application executed with hardcoded underlay IP addresses on a second computer-based device, and
   wherein said rule is created based at least on an operating system corresponding to said application executed with hardcoded underlay IP addresses on said second computer-based device, and
   wherein:
   said rule triggers a conversion of an overlay destination IP address specified within a header section of said data packet to a predetermined underlay destination IP address, in an event said data packet is transmitted from said application executed with said overlay IP address on said first computer-based device, to said application executed with said hardcoded underlay IP address on said second computer-based device;
   said rule triggers a conversion of an underlay source IP address specified within said header section of said data packet to a predetermined overlay source IP address, in an event said data packet is transmitted from said application executed with said hardcoded underlay IP address on said second computer-based device, back to said application executed with said overlay IP address on said first computer-based device;
   thereby causing said data packet to be transmitted seamlessly between said application executed with said overlay IP addresses on said first computer-based device, and said application executed with said hardcoded underlay IP addresses on said second computer-based device, without being dropped.

2. The system as claimed in claim 1, wherein said processor triggers said first DNS server to store uniform resource locators (URLs) corresponding to at least said applications executed on said hardcoded underlay IP addresses, and wherein said processor further triggers said first DNS server in an event a new application is installed and executed on at least one of said hardcoded underlay addresses.

3. The system as claimed in claim 1, wherein said processor creates said color zone by assigning at least one overlay IP address to each of said computing devices, and wherein said processor further triggers a second DNS server to store said overlay IP addresses assigned to each of said computing devices.

4. The system as claimed in claim 1, wherein said processor routes said data packet onto said overlay network by default, and wherein said processor selectively redirects said data packet onto said underlay network, based on an execution of said rule.

5. A method for selectively redirecting data packets from an overlay network to an underlay network, said method comprising the following computer-implemented steps:
assigning, by a processor, an underlay internet protocol (IP) address to a plurality of computer-based devices, and triggering, by said processor, storage of underlay internet protocol addresses on a first domain name system (DNS) server;
initiating, by said processor, a communicable coupling of computer-based devices over said overlay network, and rendering, by said processor, said overlay network as a dedicated overlay IP address space identifiable as a color zone, and routing, by said processor, communications between said plurality of computer-based devices only through said overlay network;
monitoring on a continuous basis, by said processor, said computer-based devices and at least applications executed thereon, and identifying, by said processor, applications executed on hardcoded underlay IP addresses;
dynamically creating, by said processor, at least one rule, said rule dictating transmission of at least one data packet between an application executed with overlay IP addresses on a first computer-based device, and an application executed with hardcoded underlay IP addresses on a second computer-based device, and creating, by said processor, said rule based at least on an operating system corresponding to said application executed with hardcoded underlay IP addresses on said second computer-based device, and configuring, by said processor, said rule to:
trigger a conversion of an overlay destination IP address specified within a header section of said data packet to a predetermined underlay destination IP address, in an event said data packet is transmitted from said application executed with said overlay IP address on said first computer-based device, to said application executed with said hardcoded underlay IP address on said second computer-based device;
trigger a conversion of an underlay source IP address specified within said header section of said data packet to a predetermined overlay source IP address, in an event said data packet is transmitted from said application executed with said hardcoded underlay IP address on said second computer-based device, back to said application executed with said overlay IP address on said first computer-based device;
thereby causing said data packet to be transmitted seamlessly between said application executed with said overlay IP addresses on said first computer-based device, and said application executed with said hardcoded underlay IP addresses on said second computer-based device, without being dropped.

6. The method as claimed in claim 5, wherein the method further includes the step of storing uniform resource locators (URLs) corresponding to at least said applications executed on said hardcoded underlay IP addresses, on said first DNS server, and triggering, by said processor, said DNS server in an event a new application is installed and executed on at least one of said hardcoded underlay addresses.

7. The method as claimed in claim 5, wherein the method further includes the step of creating said color zone, by said processor, by assigning at least one overlay IP address to each of said computing devices.

8. The method as claimed in claim 7, wherein the method further includes the step of triggering, by said processor, a second DNS server to store said overlay IP addresses assigned to each of said computing devices.

9. The method as claimed in claim 5, wherein the method further includes the step of routing, by said processor, said data packet onto said overlay network by default, and selectively redirecting, by said processor, said data packet onto said underlay network, based on an execution of said rule.

10. A non-transitory computer-readable store medium having computer-executable instructions stored thereon, said computer-executable instructions, when executed by a processor, cause said processor to:
assign an underlay internet protocol (IP) address to a plurality of computer-based devices, and trigger storage of underlay internet protocol addresses on a first domain name system (DNS) server;
initiate a communicable coupling of computer-based devices over said overlay network, and render said overlay network as a dedicated overlay IP address space identifiable as a color zone, and route communications between said plurality of computer-based devices only through said overlay network;
monitor on a continuous basis, said computer-based devices and at least applications executed thereon, and identify applications executed on hardcoded underlay IP addresses;
dynamically create at least one rule, said rule dictating transmission of at least one data packet between an application executed with overlay IP addresses on a first computer-based device, and an application executed with hardcoded underlay IP addresses on a second computer-based device, and create said rule based at least on an operating system corresponding to said application executed with hardcoded underlay IP addresses on said second computer-based device, and configure said rule to:
trigger a conversion of an overlay destination IP address specified within a header section of said data packet to a predetermined underlay destination IP address, in an event said data packet is transmitted from said application executed with said overlay IP address on said first computer-based device, to said application executed with said hardcoded underlay IP address on said second computer-based device;
trigger a conversion of an underlay source IP address specified within said header section of said data packet to a predetermined overlay source IP address, in an event said data packet is transmitted from said application executed with said hardcoded underlay IP address on said second computer-based device, back to said application executed with said overlay IP address on said first computer-based device;
thereby causing said data packet to be transmitted seamlessly between said application executed with said overlay IP addresses on said first computer-based device, and said application executed with said hardcoded underlay IP addresses on said second computer-based device, without being dropped.

11. The computer-executable instructions as claimed in claim 10, wherein said computer-executable instructions further cause said processor to:
trigger storage of uniform resource locators (URLs) corresponding to at least said applications executed on said hardcoded underlay IP addresses, on said first DNS server;

trigger said DNS server in an event a new application is installed and executed on at least one of said hardcoded underlay addresses;
create said color zone by assigning at least one overlay IP address to each of said computing devices;
trigger a second DNS server to store said overlay IP addresses assigned to each of said computing devices; and
route said data packet onto said overlay network by default, and selectively redirect said data packet onto said underlay network, based on an execution of said rule.

* * * * *